Patented Apr. 29, 1941

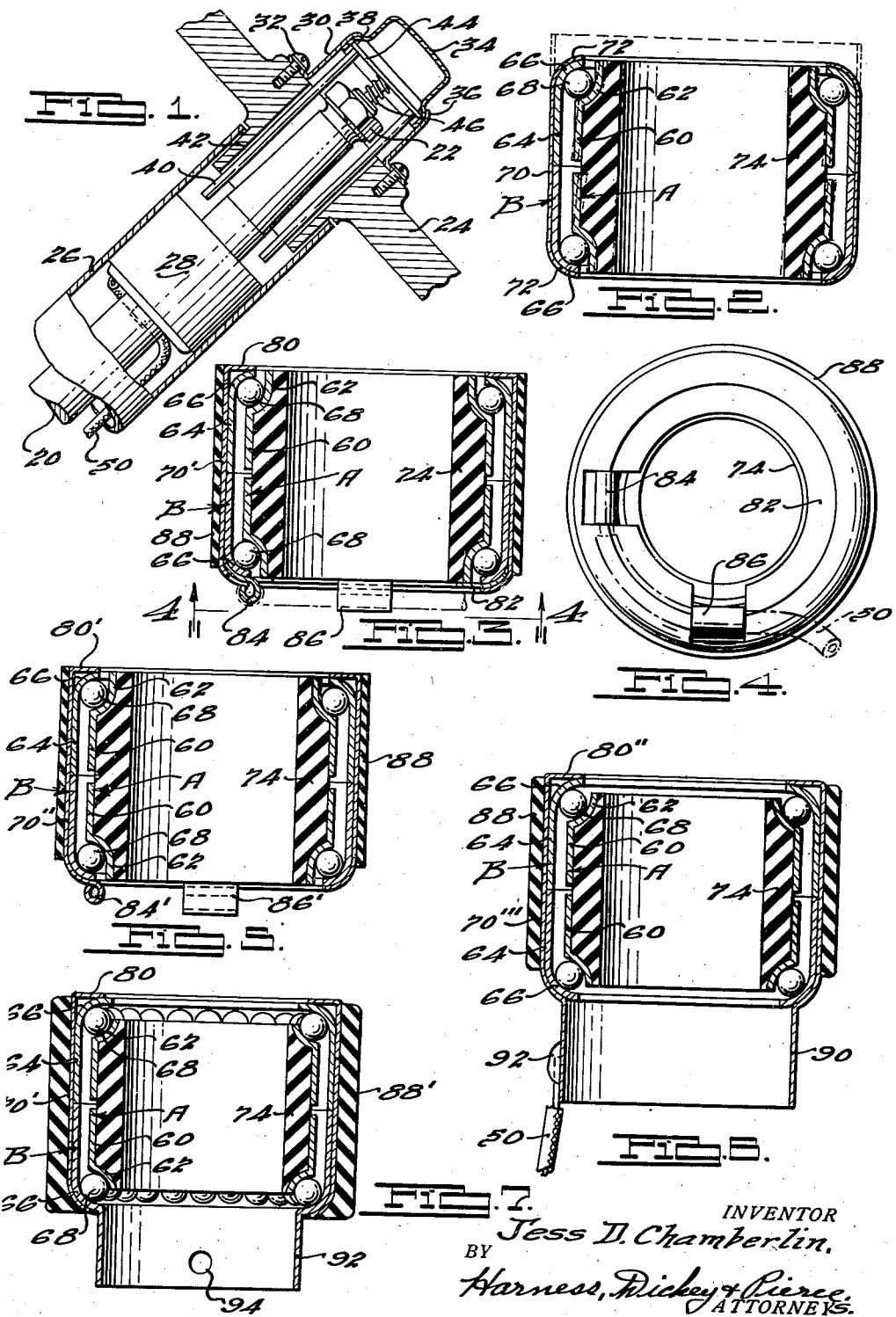

2,240,285

UNITED STATES PATENT OFFICE 2,240,285

STEERING COLUMN BUSHING

Jess D. Chamberlin, Detroit, Mich.

Application September 12, 1939, Serial No. 294,531

7 Claims. (Cl. 308—184)

This invention relates to bushings or bearings of the type adaptable for use in connection with the steering gears of motor vehicles, and for other similar uses, the principal object being the provision of a bushing or bearing of this type that is relatively simple in construction, easy to assemble, efficient in operation and economical to produce. It constitutes an improvement over certain types of similar constructions disclosed and claimed in my co-pending application for Letters Patent of the United States Serial No. 217,440, filed July 5, 1938, for improvements in Steering column bushing.

Objects of the invention include the provision of a novel form of anti-friction bearing or bushing including novel means constantly acting to take up any wear occurring between the parts, thereby to prevent rattling thereof; the provision of a bushing or bearing of the type described which is adapted to fit shafts having a large tolerance in their diametrical dimension; the provision of a bushing or bearing of the type described so constructed and arranged as to permit it to be inserted in openings or bores having relatively large tolerances in diametrical dimension; the provision of a bushing or bearing of the type described the principal parts of which may be readily formed from sheet metal or thin walled tubing; the provision of a bearing or bushing of the type described including inner and outer telescoping portions formed to provide two axially spaced pairs of oppositely disposed raceways and each being formed in two parts, the two parts of one of the portions being permanently secured together in an enclosing metal jacket and the two parts of the other portion being maintained in operative relation by means of a resilient ring associated therewith; the provision of a construction as above described in which the metallic jacket is in turn provided with a jacket of insulating material; and the provision of a construction as above described in which a limited swiveling action is possible between the two portions of the bearing permitting it to be employed between parts not in true alignment.

Further objects of the invention include the provision of a bearing or bushing of the type described so constructed and arranged as to provide an electrical contact member at one end thereof and an electrical lead extending therethrough; the provision of a bearing or bushing of the type described in which one of the operative elements thereof is formed to provide an electrical contact element; the provision of a bearing or bushing of the type described in which the enclosing jacket for one of the two-part portions is formed to provide an electrical contact element; the provision of a construction as above described in which the metallic jacket is further formed to provide a means for attachment to an electrical lead; the provision of a construction as above described in which one of the parts of one of the telescoping portions is formed to provide a means for attaching an electrical lead thereto; the provision of a construction as above described in which a connecting member for an electrical lead is secured in electrical contact with the jacket and maintained in position by being clamped between the jacket and one of the telescoping portions.

The above being among the objects of the present invention the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a partially broken, partially sectioned fragmentary side elevational view of the upper end of the steering gear for a motor vehicle, showing a bushing constructed in accordance with the present invention interposed between the steering shaft and the mast jacket thereof, the bearing being shown in side elevation;

Fig. 2 is an enlarged sectional view taken diametrically through a bearing of the type illustrated in Fig. 1 but not formed to provide any electrical conducting functions as is the bearing illustrated in Fig. 1;

Fig. 3 is an enlarged sectional view taken diametrically through the bearing illustrated in Fig. 1;

Fig. 4 is an end view of the bearing shown in Fig. 3 taken as on the line 4—4 thereof;

Figs. 5, 6 and 7 are views similar to Fig. 3 but illustrating modified forms of construction.

In my prior application, above identified, bushings or bearings similar to that of the present invention are shown and described but in every instance either the inner or outer sleeve member is shown as of one-piece or integral construction. It has been found that certain of the constructions there shown were difficult to produce commercially, the difficulty being primarily concerned with the assembly thereof and one of the principal objects of the present invention is to so modify these former constructions as to overcome this difficulty and render them relatively easy to assemble. Furthermore, the bearings or bushings shown in my prior application above identified were not as readily adapted to certain types of steering gears in which an electrical contact is made through the bearing or bushing in the operation of the horn and, accordingly, in accordance with a further phase of the present invention the bearings or bushings provided for herein may be modified to more readily adapt them to this particular use.

In order to overcome the assembly difficulties experienced in certain forms of my prior invention above identified, both inner and outer race members are made in two pieces in accordance with the present invention, the two pieces of one of the race members after assembly being secured together into a rigid unit functionally equivalent to the single piece sleeve member of my prior invention by means of an enclosing jacket or housing. This permits all of the hardened parts of the bearing to be hardened prior to assembly, facilitates assembly, and permits the use of a relatively thin, soft jacket member readily deformable to effect the final assembly step and which serves as an aid in assembly. Furthermore, where it is desired to employ the bushing as an electrical conductor member for the horn push button circuit the enclosing jacket or housing may be readily formed either by itself or in conjunction with other existing and/or additional parts to effect this purpose.

Referring now to the accompanying drawing and particularly to Fig. 1 thereof, the steering shaft of a steering gear for a motor vehicle is illustrated at 20 and as having suitably secured to the upper end thereof in a conventional manner by means of a nut 22 a suitable or conventional steering wheel 24. Below the steering wheel 24 the steering shaft 20 is surrounded by a tubular cylindrical mast jacket or steering column 26 arranged in concentric and generally radially spaced relation with respect thereto. A steering column bushing indicated generally at 28 is interposed between the upper end of the mast jacket 26 and the shaft 20 to rotatably support and guide the upper end of the shaft 20 therein.

In the construction illustrated in Fig. 1 one conventional type of horn button is illustrated and to which the bearing forming the present invention may be adapted so as to form a part of the circuit controlled thereby. The particular horn push button construction shown includes a sleeve member 30 arranged concentrically with respect to the shaft 20 and having an outwardly flanged lower marginal edge through which screws 32 are projected to rigidly secure it to the upper face of the steering wheel 24. Axially slidably received within the sleeve 30 is the horn push button proper 34, the outward movement of which in the sleeve 30 is limited by the inturned upper edge 36 of the sleeve 30 which engages the angular wall 38 of the horn push button 34. A U-shaped wire or hairpin shaped member 40 the legs of which extend downwardly through slots 42 formed in diametrically opposite sides of the central bore of the steering wheel 24 for the shaft 20 is positioned with its upper end within the horn push button 34 and such end bears against the inner surface of the shoulder 38 thereof. A washer 44 is received within the lower end of the push button 34 and receives the legs of the U-shaped member 40 therethrough and a coiled spring 46 maintained under compression between the washer 44 and the upper end of the shaft 20 constantly acts through the member 40 to urge the push button 34 upwardly. As shown the free ends of the legs of the U-shaped member 40 are normally maintained in spaced relation with respect to the upper end of the bushing 28 but may be brought into contact therewith when the push button 34 is sufficiently depressed against the force of the spring 46. The bushing or bearing 28 in Fig. 1 is provided on its upper axial face with a contact element suitably insulated from both the mast jacket 26 and the shaft 20 and means are provided for electrically connecting this contact element through the length of the bushing or bearing 28 with an insulated electrical conductor 50. It will be understood that the conductor 50 extends to the vehicle horn which in turn is connected through a source of electrical energy, such as a battery, to a ground and that the shaft 20 and mast jacket 26 are also grounded. Under such circumstances when the horn push button 34 is pressed sufficiently to bring either one or both ends of the U-shaped member 40 into contact with the upper end of the bushing 28, the electrical circuit through the horn is completed and the horn is caused to blow.

The bushing or bearing illustrated in Fig. 2 illustrates the present invention in its simplest and broadest form particularly inasmuch as no provisions are made therein for providing electrical circuits therethrough such as is required when employed in connection with a horn push button of the particular type illustrated in Fig. 1. Instead it may be assumed that the bushing or bearing illustrated in Fig. 2 may be employed in place of the bearing 28 in Fig. 1 where a different type of horn push button circuit not requiring the bushing or bearing as a part of the electrical circuit therefor is employed.

Referring to Fig. 2 it will be noted that the bushing or bearing there illustrated comprises an inner portion A and an outer portion B and each portion is made in two parts identical to one another but simply reversed in position. Each part of the inner portion A comprises a cylindrical axially inner portion 60 having formed integrally at the axially outer end thereof a radially inwardly and axially outwardly curved portion 62 the radially outer surface of which forms a ball race. The adjacent or opposed edges of the parts of the portion A are preferably spaced from one another as illustrated. Each outer portion B comprises two parts as mentioned and each part comprises a cylindrical axially inner portion 64 terminating at its axially outer end in an axially outwardly and radially inwardly turned or curved portion 66 which lies in opposed relation with respect to the corresponding portion 62 of the corresponding part of the inner portion A and the radially inner surface of which forms a ball race. Between each pair of opposed portions 62 and 66 is received a plurality of ball bearings 68, as illustrated, and which maintain the portions A and B in radially spaced and predetermined axial relation with respect to each other.

The opposed axial edges of the two parts of the portion B preferably lie in contact with each other as illustrated and are maintained in such position by means of an enclosing jacket or housing 70 the opposite axial marginal edges of which are inwardly turned as at 72 in contact with the outer surfaces of the inwardly turned ends 66 and thus serve to maintain the two parts of the portion B against axial separation as well as in axial alignment with each other. In other words the jacket 70 serves to integrate the two parts of the portion B so as to obtain substantially the same effect as though the parts of the portion B were formed integrally with each other.

The inner and outer portions A and B, as well as the jacket 70 are all preferably formed from thin walled tubing or from sheet metal and the parts of the portions A and B are preferably of hardened character. It might be noted that the radius of the surfaces of the parts 62 and 66 with which the balls 68 lie in rolling contact, is preferably greater than the radius of the balls 68.

Received within the inner portion A of the bushing or bearing is a resilient and compressible sleeve or ring 74 the outer surface of which is formed to a shape complementary to the shape of the radially inner surfaces of the portion A and snugly received therein as illustrated. The free length of the sleeve 74 and particularly that portion thereof lying between the portion 62 of the inner portion A is preferably greater than its assembled length so that when in the assembled position illustrated it constantly urges the two parts of the inner part A axially apart, thus exerting a pressure tending to compress the balls 68 between their corresponding portion 62 and 66. This feature not only prevents possible rattling of the balls between the portions A and B but also serves to take up any wear that may occur between the balls and their races. Furthermore, inasmuch as the free diameter of the bore of the ring 74 is preferably smaller than the diameter of the shaft 20 to which it is adapted to be assembled, there is a tendency of the sleeve 74 to elongate when assembled to its shaft 20 thereby accentuating this last feature.

The resiliency of the ring or sleeve 74 which is preferably made of rubber but may be made of any other suitable resilient, yieldable material, such as felt, fabric or the like, is preferably such as to permit its relatively ready assembly upon the shafts such as 20 having a relatively great tolerance in diameter, for instance such as a tolerance of ten thousandths of an inch or more. This is a desirable attribute inasmuch as the shafts 20 may thus be made from standard rolled sections without requiring machining along the area at which the bearing or bushing is applied. The resiliency of the sleeve 74 is also of advantage in permitting the use of the bearing where the connecting parts are not arranged with their axes aligned or in parallel relation, for instance in the case illustrated in Fig. 1, where the shaft 20 is not absolutely aligned with the mast jacket 26 and which occurrence would prevail where either the shaft 20 or mast jacket 26 is bent out of true straight form. In such case, however, and particularly in the present invention where the race forming portions 62 and 66 provide races of greater diameter than the diameter of the balls 68, the condition illustrated by dotted lines for the inner member A in Fig. 2 would occur. In other words the ring or sleeve 74 would be deformed so as to bring it out of true concentric relation with respect to the outer portion B but additionally the two parts of the inner portion A would also be caused to swivel or shifted with respect to their points of contact with the ball 68 as illustrated and thus permit the bearing to accommodate such mis-alignment without setting up any undue stresses or otherwise materially affecting the intended operating characteristics of the bearing.

In the bearing illustrated in Fig. 2, its outer diameter being formed of a metallic part it will usually be necessary to maintain its external diameter within relatively close limits for production purposes. For instance, where employed as a steering column bushing such as the bushing 28 illustrated in Fig. 1, the interior of the mast jacket 26 will ordinarily require machining to receive it with a light press fit as the internal diameter of the rough tubes such as the mast jacket 26 is constructed from will not ordinarily be maintained at sufficiently close limits to permit the machining to be dispensed with. However, it will be understood that the bearing illustrated in Fig. 2 may be provided, in addition to the parts shown, with a resilient and yieldable outer covering such as is illustrated in the remaining views of the drawings and as disclosed in my prior application above identified, in which case no machining of the bore of the mast jacket 26 will ordinarily not be required.

In assembling the bearing illustrated in Fig. 2 the procedure outlined below is followed. The outer jacket or housing 70 is initially formed with its lower end inwardly turned to accommodate the curved end 66 of the corresponding outer portion but the upper end thereof is allowed to remain in true cylindrical form as illustrated in dotted lines in Fig. 2. The lower half of the outer portion B is then dropped down into the jacket 70 into the position in which it lies in final assembly. The assembly thus provided is arranged with its axis in a vertical direction as illustrated in Fig. 2 and then the upper half of the inner portion A, disposed in the same relation as illustrated in Fig. 2, is projected upwardly from the bottom of the assembly so that the upper curved portion 62 thereof partially projects up through the bottom of the jacket 70. Instead of using the upper half of the inner portion A any equivalently formed member or straight cylindrical plug may be employed in its stead. In any case such member is projected upwardly through the bottom of the jacket 70 and the lower row of balls 68 is then introduced and the individual balls are distributed into their finally assembled location.

The lower half of the inner portion A is then inserted downwardly into the assembly through the upper end of the jacket or housing 70 until its lower edge rests against the upper edge of the upper half thereof or other member which has been previously inserted upwardly through the bottom of the assembly, upon which the jacket 70 and lower part of portion B is raised during the occurrence of which the lower half of the inner portion A moves downwardly into its finally assembled relationship and the upper half thereof or other member is simultaneously withdrawn from the bottom of the assembly. This places the lower parts of both portions A and B within the jacket or housing 70 in their finally assembled relationship with the corresponding row of ball bearings 68 between them.

The upper half or part of the inner portion A is then inserted downwardly through the top of the assembly until its lower edge rests against the upper edge of the lower half or part of the inner portion A and this is followed by the downward insertion of the upper half of the outer portion B into the jacket or housing 70 but in this case it is lowered only an amount sufficient to bring its lower edge into substantial alignment with the lower edge of the curved portion 62 of the upper part or half of the inner portion A, and this leaves sufficient space between the curved portions 66 and 62 of the upper parts of the portions A and B to permit the insertion of the upper row of ball bearings 68 between them. As soon as the upper row of balls bearings 68 are inserted, the upper half of the outer portion 64 is then moved downwardly into its finally assembled relation and the upper end of the jacket or housing 70 is then spun over the upper curved end 66 of the upper part of the outer portion B into the finally assembled formation shown which serves to lock the two parts or halves of the outer portion B firmly and rigidly in position. It will be understood that during the steps of assembly above described it is preferable to introduce some relatively heavy lubricant to the area of the ball races so as to provide for a substantially permanent supply of lubricant for the balls 68.

In the assembly thus far described, the parts or halves of the outer portion B are firmly and rigidly fixed with respect to each other but the two halves or parts of the inner portion A are free to move axially with respect to each other and the outer portion B. The rubber or other sleeve 74 is bent or otherwise deformed and inserted in place and this may be accomplished by partially folding the same, compressing it or otherwise acting upon it to permit it to be inserted in the inner portion A, and upon its being inserted fully into its intended position within the inner portion A it acts, as previously described, between the shoulders formed by the curved portion 62 of such parts to force the shoulders and the corresponding parts axially away from each other and thereby cause the various ball bearings 68 to be resiliently clamped between their respective opposite races. The assembly is thus completed and is ready for insertion into a steering gear or other suitable device or object.

The bearing shown in Figs. 3 and 4 in detail is assumed to be that shown in Fig. 1 and in which, as previously mentioned, is employed as a part of the electric circuit for the horn. The bearing illustrated in Fig. 3 includes inner and outer two-part portions A and B identical to those shown and described in connection with Fig. 2 and between which ball bearings 68 are received in identically the same manner as disclosed in Fig. 2. The main difference in the construction illustrated in Fig. 3 is that the jacket or housing 70' corresponding to the jacket or housing 70 previously described in connection with Fig. 2, instead of being shaped at its upper end to conform to the curvature of the upper curved end 66 of the upper part of the outer portion B instead is formed to provide a radially inwardly directed annular shoulder 80 the inner marginal edge of which bears against the upper edge of the upper part of the portion B and in this respect serves the same purpose as the jacket or housing 70 previously described. Additionally, however, it presents an upwardly facing flat annular ring which serves as a contact for engagement with the U-shaped member 40 of the horn button mechanism.

An additional difference between the construction shown in Figs. 3 and 4 and that shown in Fig. 2 is that a ring member 82 is interposed between the lower edge of the jacket or housing 70' and the lower inturned edge 66 of the lower part of the outer portion B, it being shaped in its radially outer portion to fit snugly between the portion 66 and the lower end of the sleeve or housing 70' and extends radially inwardly therefrom by a distance substantially short of the bore of the rubber ring or sleeve 74 which is identical to that shown in Fig. 2. The ring 82 is preferably provided with means to facilitate its connection to an electric lead such as the lead 50 previously described and although this may be accomplished in any suitable manner in the particular case shown it is provided with an eye 84 formed integrally therewith and of a size to receive an end of the metallic conductor within the electric lead 50 which may be soldered thereto. It is also preferably provided with a second eye 86, angularly spaced from the eye 84, also formed integrally therewith and preferably of a diameter to receive the electrical lead 50 therein so as to aid in supporting the corresponding end of the lead. Additionally, the eye 86 may be pinched slightly closed to clamp the lead 50 therein.

It will, of course, be understood that the bearing illustrated in Figs. 3 and 4, being employed as part of an electrical circuit, must be insulated both internally and externally against contact with other metallic parts. The rubber sleeve 74 serves to insulate it from a metallic member such as the shaft 20 received therein. In order to insulate the bearing from the mast jacket 26 or other equivalent supporting member, the jacket or housing 70' is enclosed in a sleeve 88 of suitable insulating material and while, in the broader aspects of the invention this may be constructed of any suitable electrical insulating material of either a soft and resilient character or of a rigid character, it is preferably constructed from substantially the same material as the sleeve 74 is constructed from and preferably a suitably soft grade of rubber and preferably vulcanized directly thereto. It may be of such thickness as is required to effect the desired purpose but particularly where employed in a mast jacket in a steering gear, such as the mast jacket 26 illustrated in Fig. 1, in order to eliminate the necessity of machining the rough interior of the mast jacket 26, it is preferably made of such thickness as to permit it to yield sufficiently to snugly fit the bore of the mast jacket where the diameter of such bore is within the usual tolerances of such tubes as received from the manufacturer.

The bearing illustrated in Fig. 5 is substantially the same as that illustrated in Figs. 3 and 4 except for the following described differences, and consequently all parts identical to those illustrated in Figs. 3 and 4 are indicated by the same numerals. The only difference between these constructions is the method followed in forming the same to provide an electrical circuit therethrough and in the method of securing the electric lead 50 thereto. In Fig. 5 instead of employing a separate contact ring member such as the ring member 82, the lower end of the jacket or housing 70", which is otherwise identical to the part 70' in Figs. 3 and 4, is formed to provide a pair of eyes 84' and 86' corresponding exactly to the eyes 84 and 86 in Figs. 3 and 4, but in this case formed integrally with the jacket or housing 70'. Accordingly, the jacket or housing 70" in this case is preferably formed of brass or the like but may be formed of any suitable metal.

Likewise the only difference between the construction illustrated in Fig. 6 and that illustrated in Figs. 3, 4 and 5 is in connection with the method of attaching the electrical lead 50 thereto, the construction in this case following the construction shown in Fig. 5 more closely but instead of providing the eyes 84' and 86' on the sleeve or jacket, illustrated as 70''' in this case, the lower end of the jacket or housing 70''' in this case is extended in cylindrical form of smaller diameter than the main body portion thereof as illustrated at 90 and the conducting element of the lead 50 is soldered directly thereto as illustrated at 92. All of the rest of the parts of the construction illustrated in Fig. 6 are identical to equivalent parts illustrated in Figs. 3, 4 and 5 and are indicated by the same numerals, which thus eliminates the necessity for further description of the same.

In the construction illustrated in Fig. 7 a still different method of securing the electrical lead 50 is shown. In this case the construction is substantially similar to that illustrated in Figs. 3 and 4 and identical parts are illustrated by the same numerals. The main difference is that the conducting ring 82 and the eyes 84 and 86 are eliminated and the only change is in connection with the lower half of the outer portion B which in this case is provided at its lower end with a tubular axial extension 92 to which the electrical lead 50 is adapted to be connected and which connection may be facilitated by the provision of an opening such as 94 in the extension 92. It may also be noted in this case the exterior rubber sleeve 88', corresponding to the sleeve 88 previously shown and described, is of a slightly greater section than those previously described and is extended to a greater extent below the lower end of the jacket or housing 70'. Other parts being identical to parts already described, further description of this modification is not believed necessary.

Formal changes may be made in the specific embodiments of the invention described without departing from the spirit or substance of the broad invention, the scope of which is commensurate with the appended claims.

What is claimed is:

1. A unitary bearing assembly applicable to and removable from a device as such, comprising, in combination, an inner metallic sleeve portion and an outer metallic sleeve portion arranged in concentric and generally radially spaced relation, each of said sleeve portions comprising a pair of separately formed parts disposed at axially opposite ends of said bearing assembly, each part of said sleeve portion being formed to provide a raceway, said raceways being arranged in opposed pairs and a plurality of ball bearings received between each opposed pair of raceways, the two parts of the inner of said sleeve portion being axially spaced from one another, a sleeve of resilient material received by said inner sleeve portion and constantly acting against the two parts thereof to urge said two parts axially outwardly away from each other, the two parts of the outer sleeve portion being arranged in axially contacting relationship, a metallic jacket exteriorly embracing said outer sleeve portion maintaining the concentricity of the parts of said portion, and inwardly turned ends on said jacket embracing the ends of the two parts of said outer sleeve portion and maintaining them against axial separation.

2. A unitary bearing assembly applicable to and removable from operative position in a device as such, comprising, in combination, a pair of metallic sleeve portions the opposite ends of both of which are curved inwardly in spaced relation with respect to each other to form between them two pair of opposed ball races, a plurality of balls disposed between each of said opposed pair of races, the inwardly disposed end portions of the inner of said sleeve portions providing internally of said sleeve portion a pair of axially spaced shoulders, each of said sleeve portions comprising a pair of separately formed parts arranged in axially opposed relationship, the parts of the outer sleeve portion being arranged in contacting relationship and the parts of the inner sleeve portion being arranged in spaced relationship, a resilient sleeve member fitting within the inner sleeve portion and having shoulder portions abutting the inwardly exposed shoulder portions of said inner sleeve member and constantly acting to urge the parts of said inner sleeve portion axially away from each other, and a metallic jacket embracing said outer sleeve portion in contacting relationship with respect thereto and having inwardly turned end portions thereon engaging the opposite ends of said outer sleeve portion and maintaining the parts thereof in contacting relationship and the assembly as a whole in a unitary and assembled relationship.

3. A unitary bearing assembly applicable to and removable from operative position in a device as such, comprising, in combination, a pair of metallic sleeve portions the opposite ends of both of which are curved inwardly in spaced relation with respect to each other to form between them two pair of opposed ball races, the inwardly turned ends of the outer sleeve portion being disposed axially outwardly of the inwardly turned ends of the inner sleeve portion and radially overlapping said inner sleeve portion in axial view, a plurality of ball bearings disposed between each of said opposed pair of races, each of said sleeve portions comprising a pair of separately formed parts arranged in axially opposed relationship, the parts of the outer sleeve portion being arranged in axially contacting relationship and the parts of the inner sleeve portion being arranged in axially spaced relationship, resilient means positioned within said inner sleeve member and acting between the two parts thereof to constantly urge said parts away from each other in an axial direction, a metallic jacket embracing the outer sleeve portion, and inwardly turned ends on said jacket embracing the opposite ends of said outer sleeve portion serving to clamp the two parts thereof against separation and thereby unifying said assembly.

4. A unitary bearing assembly applicable to and removable from operative position in a device as such, comprising, in combination, a pair of metallic sleeve portions arranged in generally radially spaced relationship, each of said sleeve portions comprising a pair of separately formed parts disposed at opposite ends of said bearing assembly, the opposite ends of both of said portions being curved inwardly to form a pair of opposed ball races at each end of said assembly, the inwardly turned ends of said inner sleeve portion providing a pair of axially spaced annular shoulders interiorly thereof, a plurality of ball bearings disposed between each of said opposed pair of races, resilient means received by said inner sleeve portion and acting against said shoulders to constantly urge the two parts thereof in axially spaced relationship and to resiliently clamp said ball bearings between their respective races, the parts of the outer sleeve portion being fixed against axial approach, means for maintaining the parts of said outer sleeve portion concentric and against axial separation and simultaneously providing an electrical connection between opposite ends of said assembly comprising a metallic jacket enclosing said outer sleeve portion and maintaining the concentricity thereof, the end portions on said jacket embracing the axially outer ends of said outer sleeve portion and maintaining the parts thereof against axial separation and one of said end portions being formed to present an annular electrical contact surface, and a sleeve of electrical insulating material surrounding said jacket.

5. A unitary bearing assembly applicable to and removable from operative position in a device as such, comprising, in combination, a pair of metallic sleeve portions arranged in generally radially spaced relationship, each of said sleeve portions comprising a pair of separately formed parts disposed at opposite ends of said bearing assembly, the opposite ends of both of said portions being curved inwardly to form a pair of opposed ball races at each end of said assembly, the inwardly turned ends of said inner sleeve portion providing a pair of axially spaced annular shoulders interiorly thereof, a plurality of ball bearings disposed between each of said opposed pair of races, a sleeve of yieldable and resilient electrical insulating material received within said inner sleeve portion between and engaging said shoulders thereof to constantly urge the parts of said inner sleeve portion in a direction tending to separate said parts axially, the parts of the outer sleeve portion being fixed against axial approach, means for maintaining the parts of said outer sleeve portion concentric and against axial separation and simultaneously providing an electrical connection between opposite ends of said assembly comprising a metallic jacket enclosing said outer sleeve portion and maintaining the concentricity thereof, the end portions on said jacket embracing the axially outer ends of said outer sleeve portion and maintaining the parts thereof against axial separation, one end of said jacket being formed to simultaneously serve as an abutment for the end of the corresponding of said outer sleeve portions and to present an annular electrical contact surface, means at the opposite end of said assembly in electrically connected relation with respect to said contact surface providing means for effecting an electrical connection, and a sleeve of electrical insulating material surrounding said jacket.

6. A unitary bearing assembly applicable to and removable from operative position in a device as such, comprising, in combination, a pair of metallic sleeve portions arranged in generally radially spaced relationship, each of said sleeve portions comprising a pair of separately formed parts disposed at opposite ends of said bearing assembly, the opposite ends of both of said portions being curved inwardly to form a pair of opposed ball races at each end of said assembly, the inwardly turned ends of said inner sleeve portion providing a pair of axially spaced annular shoulders interiorly thereof, a plurality of ball bearings disposed between each of said opposed pair of races, a sleeve of yieldable and resilient electrical insulating material received within said inner sleeve portion between and engaging said shoulders thereof to constantly urge the parts of said inner sleeve portion in a direction tending to separate said parts axially, the parts of the outer sleeve portion being fixed against axial approach, means for maintaining the parts of said outer sleeve portion concentric and against axial separation and simultaneously providing an electrical connection between opposite ends of said assembly comprising a metallic jacket enclosing said outer sleeve portion and maintaining the concentricity thereof, the end portions on said jacket embracing the axially outer ends of said outer sleeve portion and maintaining the parts thereof against axial separation, one of said end portions being internally formed to present an annular abutment for the end of one of said parts of said outer sleeve portion and externally formed to provide an electrical contact surface, an extension on that part of one of said sleeve portions opposite said annular contact providing means for attachment of an electrical lead thereto, and a sleeve of electrical insulating material surrounding said jacket.

7. A unitary bearing assembly applicable to and removable from operative position in a device as such, comprising, in combination, a pair of metallic sleeve portions arranged in generally radially spaced relationship, each of said sleeve portions comprising a pair of separately formed parts disposed at opposite ends of said bearing assembly, the opposite ends of both of said portions being curved inwardly to form a pair of opposed ball races at each end of said assembly, the inwardly turned ends of said inner sleeve portion providing a pair of axially spaced annular shoulders interiorly thereof, a plurality of ball bearings disposed between each of said opposed pair of races, a sleeve of yieldable and resilient electrical insulating material received within said inner sleeve portion between and engaging said shoulders thereof to constantly urge the parts of said inner sleeve portion in a direction tending to separate said parts axially, the parts of the outer sleeve portion being fixed against axial approach, a jacket enclosing said outer sleeve portion and maintaining the concentricity thereof, one end portion on said jacket embracing the corresponding axially outer end of said outer sleeve portion and being exteriorly formed to present an annular electrical contact surface, an electrical connection member including an annular portion lying in contact with that end of said outer sleeve portion opposite said contact surface, the corresponding end of said jacket being inwardly turned over said annular portion whereby to clamp it to said outer sleeve portion and to cooperate with the opposite end of said jacket to maintain the parts of said outer sleeve portion against axial separation, and a sleeve of electrical insulating material surrounding said jacket.

JESS D. CHAMBERLIN.